US011062078B1

(12) United States Patent
Ge et al.

(10) Patent No.: US 11,062,078 B1
(45) Date of Patent: Jul. 13, 2021

(54) INSULATION COORDINATION METHOD AND SYSTEM FOR A SERIES COMPENSATION APPARATUS, STORAGE MEDIUM AND ELECTRONIC DEVICE

(71) Applicants: GLOBAL ENERGY INTERCONNECTION RESEARCH INSTITUTE CO., LTD., Beijing (CN); STATE GRID CORPORATION OF CHINA, Beijing (CN)

(72) Inventors: Jing Ge, Beijing (CN); Zhengang Lu, Beijing (CN); Guoliang Zhao, Beijing (CN); Linhai Cai, Beijing (CN); Haijun Liu, Beijing (CN)

(73) Assignees: GLOBAL ENERGY INTERCONNECTION RESEARCH INSTITUTE CO., LTD., Beijing (CN); STATE GRID CORPORATION OF CHINA, Beijing (CN)

( * ) Notice: Subject to any disclaimer, the term of this patent is extended or adjusted under 35 U.S.C. 154(b) by 0 days.

(21) Appl. No.: 16/493,744

(22) PCT Filed: Jul. 25, 2019

(86) PCT No.: PCT/CN2019/097645
§ 371 (c)(1),
(2) Date: Sep. 12, 2019

(87) PCT Pub. No.: WO2020/057252
PCT Pub. Date: Mar. 26, 2020

(30) Foreign Application Priority Data

Sep. 21, 2018 (CN) .......................... 201811105474.7

(51) Int. Cl.
*G06F 30/398* (2020.01)
*G06F 30/20* (2020.01)
(Continued)

(52) U.S. Cl.
CPC .............. *G06F 30/398* (2020.01); *H02J 3/12* (2013.01); *G06F 30/20* (2020.01); *G06F 30/337* (2020.01);
(Continued)

(58) Field of Classification Search
CPC .... G06F 30/398; G06F 30/20; G06F 30/3308; G06F 30/337; G06F 2113/04;
(Continued)

(56) References Cited

U.S. PATENT DOCUMENTS 5,568,039 A * 10/1996 Fernandez .......... H02J 7/00036
320/150
5,949,694 A * 9/1999 Amerasekera ........ G06F 30/367
716/115
(Continued)

FOREIGN PATENT DOCUMENTS

| CN | 101694939 A | 4/2010 |
| CN | 102185307 A | 9/2011 |

(Continued)

OTHER PUBLICATIONS

"Surge Protection Anthology: Part 6—Tutorials, Textbooks, and Reviews", Apr. 2004, 79 pages. (Year: 2004).*
(Continued)

*Primary Examiner* — Phallaka Kik
(74) *Attorney, Agent, or Firm* — Burns & Levinson, LLP; Joseph M. Maraia

(57) ABSTRACT

Provided are an insulation coordination method and system for a series compensation apparatus, a storage medium and an electronic device. The method includes determining a topology of a series compensation apparatus and a system parameter and an operation mode of an access system of the series compensation apparatus; performing overvoltage partitioning on the series compensation apparatus; constructing (Continued)

a simulated operating condition according to a plurality of overvoltage analysis areas and an operating condition; establishing an overvoltage simulation analysis model; in each overvoltage analysis area, performing a simulating calculation for different preset fault types according to the overvoltage simulation analysis model; determining the number of lightning arresters installed in each overvoltage analysis area and a continuous operating voltage value of each lightning arrester; and determining, according to a preset insulation coordination coefficient and the continuous operating voltage value of each lightning arrester, a safe operating voltage of the series compensation apparatus.

20 Claims, 6 Drawing Sheets

(51) Int. Cl.
*G06F 30/3308* (2020.01)
*G06F 30/337* (2020.01)
*H02J 3/12* (2006.01)
*G06F 113/04* (2020.01)
*G06F 119/06* (2020.01)
*G06F 119/02* (2020.01)

(52) U.S. Cl.
CPC ...... *G06F 30/3308* (2020.01); *G06F 2113/04* (2020.01); *G06F 2119/02* (2020.01); *G06F 2119/06* (2020.01); *H02J 2203/20* (2020.01)

(58) Field of Classification Search
CPC .... G06F 2119/02; G06F 2119/06; H02J 3/12; H02J 2203/04
USPC ......... 716/133, 136, 111, 109; 703/4, 14, 18
See application file for complete search history.

(56) References Cited

U.S. PATENT DOCUMENTS

| 8,327,310 | B1* | 12/2012 | Oliva | ................... G06F 30/367 716/136 |
| 2002/0017893 | A1* | 2/2002 | Duff, Jr. | ................... H02H 7/16 320/100 |
| 2017/0031373 | A1 | 2/2017 | Hackl et al. | |

FOREIGN PATENT DOCUMENTS

| CN | 104578127 A | 4/2015 |
| CN | 109462225 A | 3/2019 |

OTHER PUBLICATIONS

Kong et al., Machine Translation of Chinese Patent Document No. CN 102185307A, machine translated by Espacenet, machine translated on May 8, 2021, 12 pages. (Year: 2021).*

Zhang et al., Machine Translation of Chinese Patent Document No. CN 101694939A, machine translated by Espacenet, machine translated on May 8, 2021, 17 pages. (Year: 2021).*

Yongxia et al., Machine Translation of Chinese Patent Document No. CN 104578127A, machine translated by Espacenet, machine translated on May 8, 2021, 13 pages. (Year: 2021).*

International Seach Report dated Oct. 29, 2019, for related Application No. PCT/CN2019/097645.

* cited by examiner

INSULATION COORDINATION METHOD AND SYSTEM FOR A SERIES COMPENSATION APPARATUS, STORAGE MEDIUM AND ELECTRONIC DEVICE

CROSS REFERENCE TO RELATED APPLICATIONS

This is a U.S. National Stage Application, filed under 35 U.S.C. 371, of International Patent Application No. PCT/CN2019/097645, filed on Jul. 25, 2019, which claims priority to Chinese patent application No. 201811105474.7, filed on Sep. 21, 2018, contents of both of which are incorporated herein by reference in their entireties.

TECHNICAL FIELD

The present application relates to the field of series compensation technologies, for example, to an insulation coordination method and system for a series compensation apparatus, a storage medium and an electronic device.

BACKGROUND

The development of national economy imposes an increasing demand for electric energy and higher and higher requirements on a power transmission capacity of a power grid. However, limited by environmental impact assessment and high manufacturing costs, the deployment of a new high-voltage power transmission line cannot satisfy the increasing demand for electric energy; therefore, the burden on the existing transmission line is increased and the problem of an insufficient power transmission capacity is increasingly highlighted.

By use of the latest developments and achievements of power electronic technologies and modern control technologies, a series compensation apparatus performs flexible, quick and accurate control on parameters of an alternating current transmission system. The series compensation apparatus can implement the reasonable distribution of transmission power, reduce power losses, and significantly improve the transmission capacity of the transmission line and the stability and reliability of a power system, and is an important means for the safety, economy and comprehensive control of the power system and plays an important role in fully utilizing power grid resources and achieving the high-efficiency utilization of electric energy.

Since the series compensation apparatus has many elements and relatively complex operating conditions, when the series compensation apparatus is operated in the power grid, various faults or abnormal conditions may occur, for example, a through-line fault current, a overvoltage which is multiple times the series voltage or even higher. The overvoltage in a device or the system damages the apparatus and threatens the stability of the system. Therefore, an insulation coordination method for the series compensation apparatus is particularly important. However, the insulation coordination method in the related art ignores the influence of system-side faults on the series compensation apparatus and the alternating current system. The lightning arrester configuration protection mode is limited and is difficult to solve various fault types, and the reliability of the system needs to be improved.

SUMMARY

Embodiments of the present application provide an insulation coordination method and system for a series compensation apparatus, a storage medium and an electronic device, to solve the problem in the related art that the insulation coordination method ignores influence of the system-side faults on the series compensation apparatus, and the lightning arrester configuration protection mode is limited and has low reliability, and is difficult to adapt to various fault types.

An embodiment of the present application provides an insulation coordination method for a series compensation apparatus. The method includes the following steps. A topology of a series compensation apparatus to be tested and a system parameter and an operation mode of an access system of the series compensation apparatus to be tested are determined. Overvoltage partitioning is performed on the series compensation apparatus to be tested according to the topology, the system parameter and the operation mode to obtain a plurality of overvoltage analysis areas. A simulated operating condition of the series compensation apparatus to be tested is constructed according to the plurality of overvoltage analysis areas and an operating condition of the series compensation apparatus to be tested. An overvoltage simulation analysis model is established, according to the simulated operating condition, for the series compensation apparatus to be tested. In each of the plurality of overvoltage analysis areas, a simulating calculation is performed for different preset fault types according to the overvoltage simulation analysis model to obtain a simulating calculation result. The number of lightning arresters installed in each of the plurality of overvoltage analysis areas and a continuous operating voltage of each lightning arrester are determined according to a preset lightning arrester configuration principle and the simulating calculation result; and a safe operating voltage of the series compensation apparatus to be tested is determined according to a preset insulation coordination coefficient and the continuous operating voltage value of each lightning arrester.

An embodiment of the present application provides an insulation coordination system for a series compensation apparatus. The system includes an information determination module, an overvoltage partitioning module, a simulated operating condition determination module, a system overvoltage simulation analysis model construction module, a simulation and calculation module, a lighting arrester parameter determination module and a safe operating voltage determination module. The information determination module is configured to determine a topology of a series compensation apparatus to be tested and a system parameter and an operation mode of an access system of the series compensation apparatus to be tested. The overvoltage partitioning module is configured to perform, according to the topology, the system parameter and the operation mode, overvoltage partitioning on the series compensation apparatus to be tested to obtain a plurality of overvoltage analysis areas. The simulated operating condition determination module is configured to construct a simulated operating condition of the series compensation apparatus to be tested according to the plurality of overvoltage analysis areas and an operating condition of the series compensation apparatus to be tested. The system overvoltage simulation analysis model construction module is configured to establish, according to the simulated operating condition, an overvoltage simulation analysis model for the series compensation apparatus to be tested. The simulation and calculation module is configured to perform, in each of the plurality of overvoltage analysis areas, a simulating calculation for different preset fault types according to the overvoltage simulation analysis model to obtain a simulating calculation result. The lighting arrester parameter determination module is configured to determine, according to a preset lightning arrester configuration principle and the simulating calculation result, the number of lightning arresters installed in each of the plurality of overvoltage analysis areas and a continuous operating voltage value of each lightning arrester. The safe operating voltage determination module is configured to determine, according to a preset insulation coordination coefficient and the continuous operating voltage value of each lightning arrester, a safe operating voltage of the series compensation apparatus to be tested.

An embodiment of the present application provides a non-transient computer-readable storage medium. The non-transient computer-readable storage medium is configured to store computer instructions for enabling a computer to execute the method in the embodiment described above.

An embodiment of the present application provides a computer program product including a computer program stored on a non-transient computer-readable storage medium. The computer program includes program instructions that, when executed by a computer, enable the computer to execute the method in the embodiment described above.

DETAILED DESCRIPTION

Solutions in the present application will be described below in detail in conjunction with the drawings. The embodiments described below are part, not all of the embodiments of the present application.

In addition, if not in conflict, technical features involved in different embodiments described below of the present application may be combined with each other.

Embodiment 1

Figure 1:
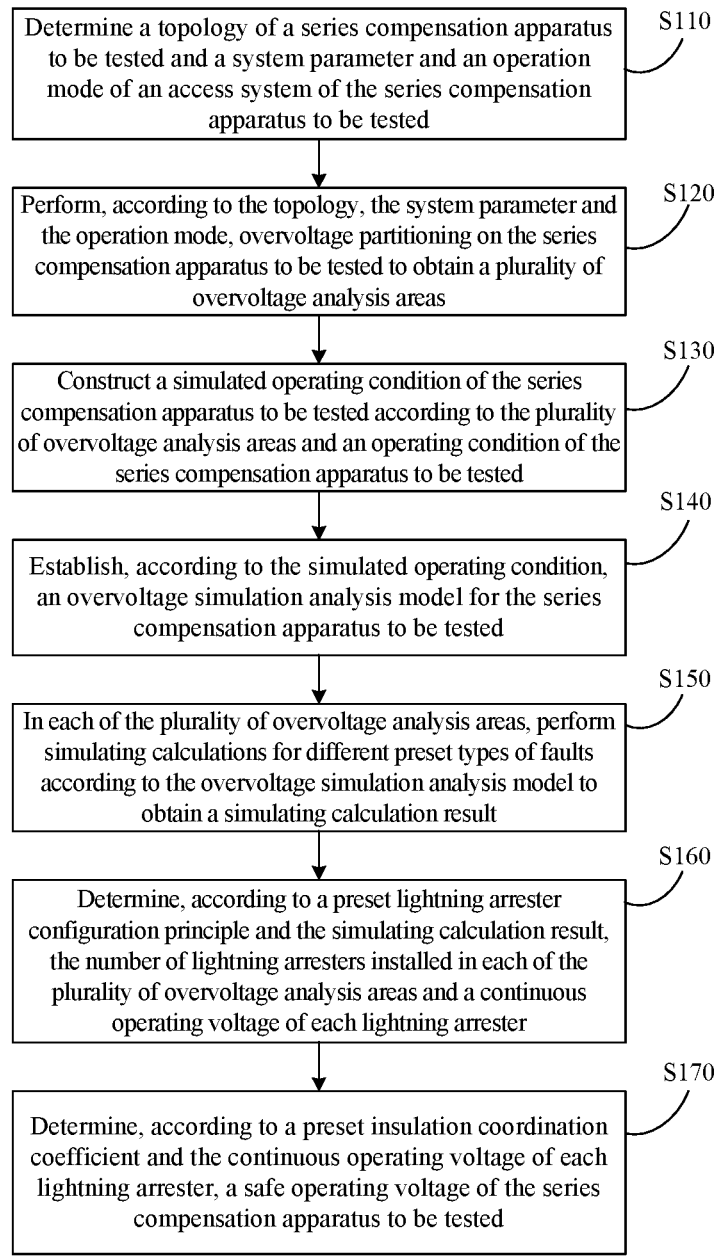
FIG. 1 is a flowchart of an insulation coordination method for a series compensation apparatus according to an embodiment of the present application.

An embodiment of the present application provides an insulation coordination method for a series compensation apparatus. As shown in FIG. 1, the method includes steps S110 to S170.

In S110, a topology of a series compensation apparatus to be tested and a system parameter and an operation mode of an access system of the series compensation apparatus to be tested are determined.

In S120, according to the topology, the system parameter and the operation mode, overvoltage partitioning is performed on the series compensation apparatus to be tested to obtain a plurality of overvoltage analysis areas.

In S130, a simulated operating condition of the series compensation apparatus to be tested is constructed according to the plurality of overvoltage analysis areas and an operating condition of the series compensation apparatus to be tested.

In S140, an overvoltage simulation analysis model is established, according to the simulated operating condition, for the series compensation apparatus to be tested.

In S150, in each of the plurality of overvoltage analysis areas, a simulating calculation is performed for different preset fault types according to the overvoltage simulation analysis model to obtain a simulating calculation result.

In S160, the number of lightning arresters to be installed in each of the plurality of overvoltage analysis areas and a continuous operating voltage value of each lightning arrester are determined according to a preset lightning arrester configuration principle and the simulating calculation result.

In S170, a safe operating voltage of the series compensation apparatus to be tested is determined according to a preset insulation coordination coefficient and the continuous operating voltage value of each lightning arrester.

Through the cooperation of steps S110 to S170, the insulation coordination method for the series compensation apparatus provided by the embodiment of the present application accurately calculates overvoltage values of various devices in the series compensation apparatus, determines a lightning arrester configuration scheme, and further determines the safe operating voltage of the series compensation apparatus to be tested, so that the series compensation apparatus can safely operate under various fault types, thereby improving stability and reliability of an entire power transmission system. The insulation coordination method for the series compensation apparatus has a wide application range and a high practical engineering application value.

The insulation coordination method for the series compensation apparatus provided by the embodiment of the present application will be described below in conjunction with examples.

Figure 2:
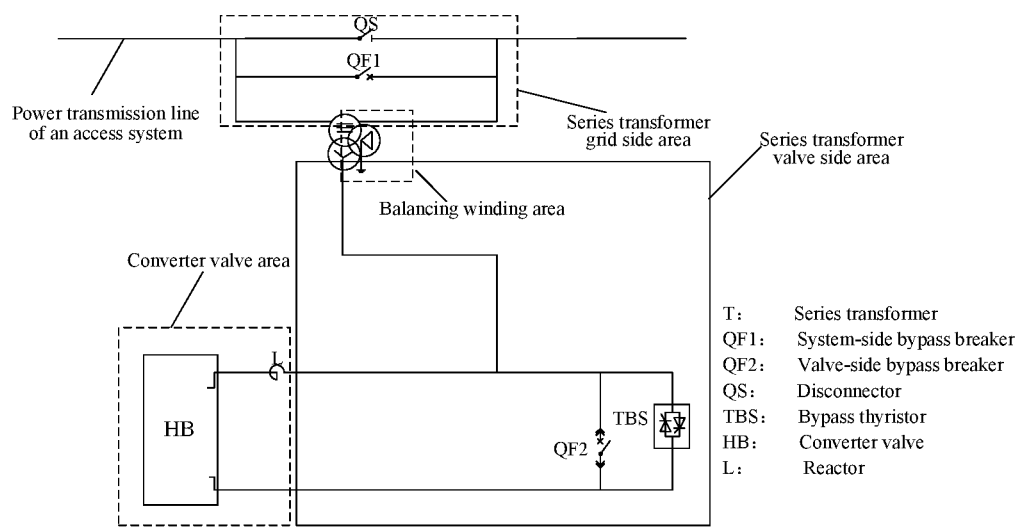
FIG. 2 is a schematic diagram of a circuit structure of a series compensation apparatus according to an embodiment of the present application.

In an embodiment, in S110, the topology of the series compensation apparatus to be tested and the system parameter and the operation mode of the access system of the series compensation apparatus to be tested are determined. FIG. 2 is a structural diagram of a main circuit of the series compensation apparatus. As shown in FIG. 2, the main circuit of the series compensation apparatus includes: a series transformer, a system-side bypass breaker, a disconnector, a bypass thyristor, a reactor (such as a dry reactor), a valve-side bypass breaker, a converter valve, and an alternating current lead. The series compensation apparatus is connected in series with a transmission line and generates a voltage having a controllable amplitude, where a phase of the voltage is orthogonal to a phase of the current of the transmission line. By controlling the output voltage of the series compensation apparatus, an equivalent impedance of the transmission line to which the series compensation apparatus is connected in series may be changed, so that active power and reactive power transmitted by the transmission line are regulated, and power oscillation is damped, subsynchronous oscillation is inhibited, transient stability is improved, and so on. In an embodiment, the circuit structure is used for calculating the overvoltage values of the various devices in the series compensation apparatus in the embodiment of the present application. In practical applications, other circuit structures may be used, which are not limited in the present application.

Figure 3:
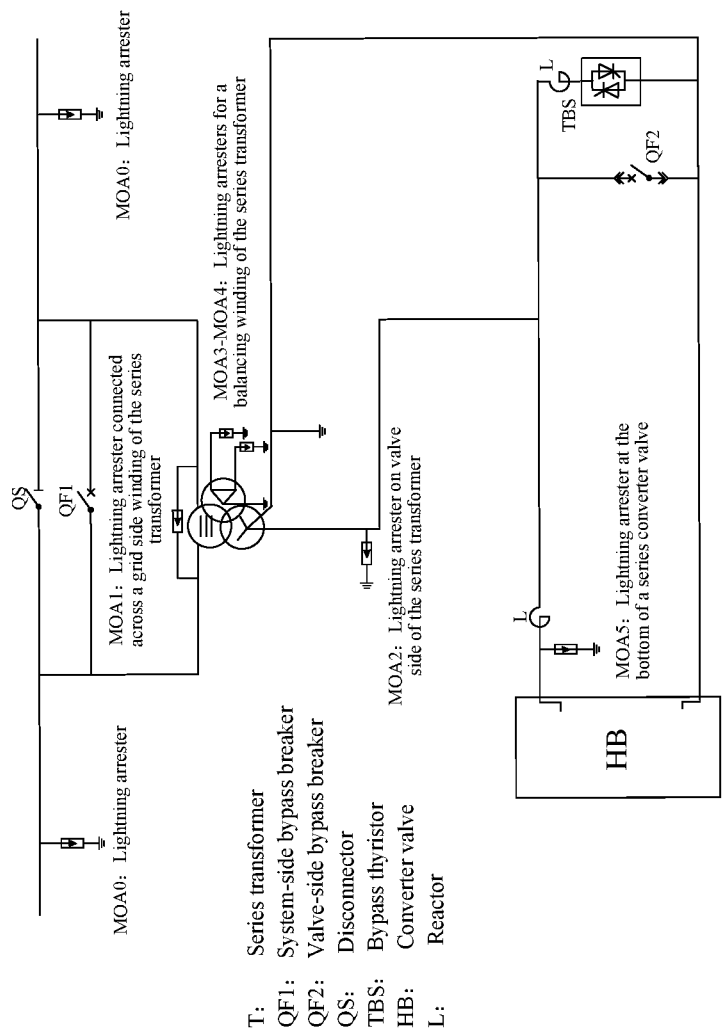
FIG. 3 is a structural diagram of a lighting arrester configuration for a series compensation apparatus according to an embodiment of the present application.

In an embodiment, the lightning arrester configuration scheme of the series compensation apparatus is shown in FIG. 3. The lightning arresters configured for the series compensation apparatus include: a lightning arrester for the line, a lightning arrester connected across a grid side winding of the series transformer, a lightning arrester on valve side of the series transformer, a lightning arrester for a balancing winding the series transformer, a lightning arrester at a bottom of a series converter valve and the like. In an embodiment, a metal oxide arrester MOA0 is the lightning arrester for the line and is configured to prevent a lightning overvoltage. A metal oxide arrester MOA1 is the lightning arrester connected across the grid side winding of the series transformer and configured to protect turn-to-turn insulation of the winding on the grid side of the series transformer, and is connected across the winding on the grid side. A metal oxide arrester MOA2 is the lightning arrester on the valve side of the series transformer and configured to prevent a winding on the valve side of the series transformer from overvoltage and protect the turn-to-turn insulation of the connection between the reactor and the converter. This lightning arrester is installed on the valve side of the series transformer. The metal oxide arrester MOA3/MOA4 are the lightning arresters for the balancing winding of the series transformer, and are configured to prevent the balancing winding of the series transformer from the overvoltage and protect the insulation of the balancing winding. The lightning arresters are installed at the balancing winding of the series transformer. The metal oxide arrester MOA5 is the lightning arrester at the bottom of the series converter valve and is configured to prevent the overvoltage between ends of the converter valve and directly protect the ends of the converter valve and devices at the ends of the converter valve. This lightning arrester is installed between the ends of the converter valve.

In an embodiment, in S120, according to the topology, the system parameter and the operation mode, the overvoltage partitioning is performed on the series compensation apparatus to be tested, and the plurality of overvoltage analysis areas are obtained. In an embodiment, as shown in FIG. 2, the possible overvoltage in the series compensation apparatus includes multiple types, such as a lighting overvoltage on line side (grid side), an operating overvoltage, a temporary overvoltage, an internal power frequency overvoltage of the series compensation apparatus to be tested. Therefore, the series compensation apparatus to be tested is partitioned, according to operation modes of different devices, into the plurality of overvoltage analysis areas including a series transformer grid side area, a series transformer valve side area, a balance winding area and a converter valve area.

In an embodiment, in S130, the simulated operating condition of the series compensation apparatus to be tested is constructed according to the plurality of overvoltage analysis areas and the operating condition of the series compensation apparatus to be tested. In practical applications, the operating condition of the series compensation apparatus to be tested includes a saturation situation of a transformer, a setting value of the bypass thyristor, a setting value of a module distributed bypass, a grounding mode, a maximum operation mode and the like.

In an embodiment, in S140, the overvoltage simulation analysis model is established according to the simulation state for the series compensation apparatus to be tested. In practical applications, the overvoltage simulation analysis model of the series compensation apparatus to be tested may be established on a simulation platform provided by a Real Time Digital Simulator (RTDS). An equivalent overvoltage simulation analysis model of the series compensation apparatus to be tested is established on the simulation platform of the RTDS by converting the system parameter of the access system of the series compensation apparatus to be tested into an equivalent parameter, and converting the saturation situation of the transformer, the setting value of the bypass thyristor, the setting value of the module distributed bypass, the grounding mode, the maximum operation mode and the like of the series compensation apparatus to be tested into corresponding parameters.

Figure 4:
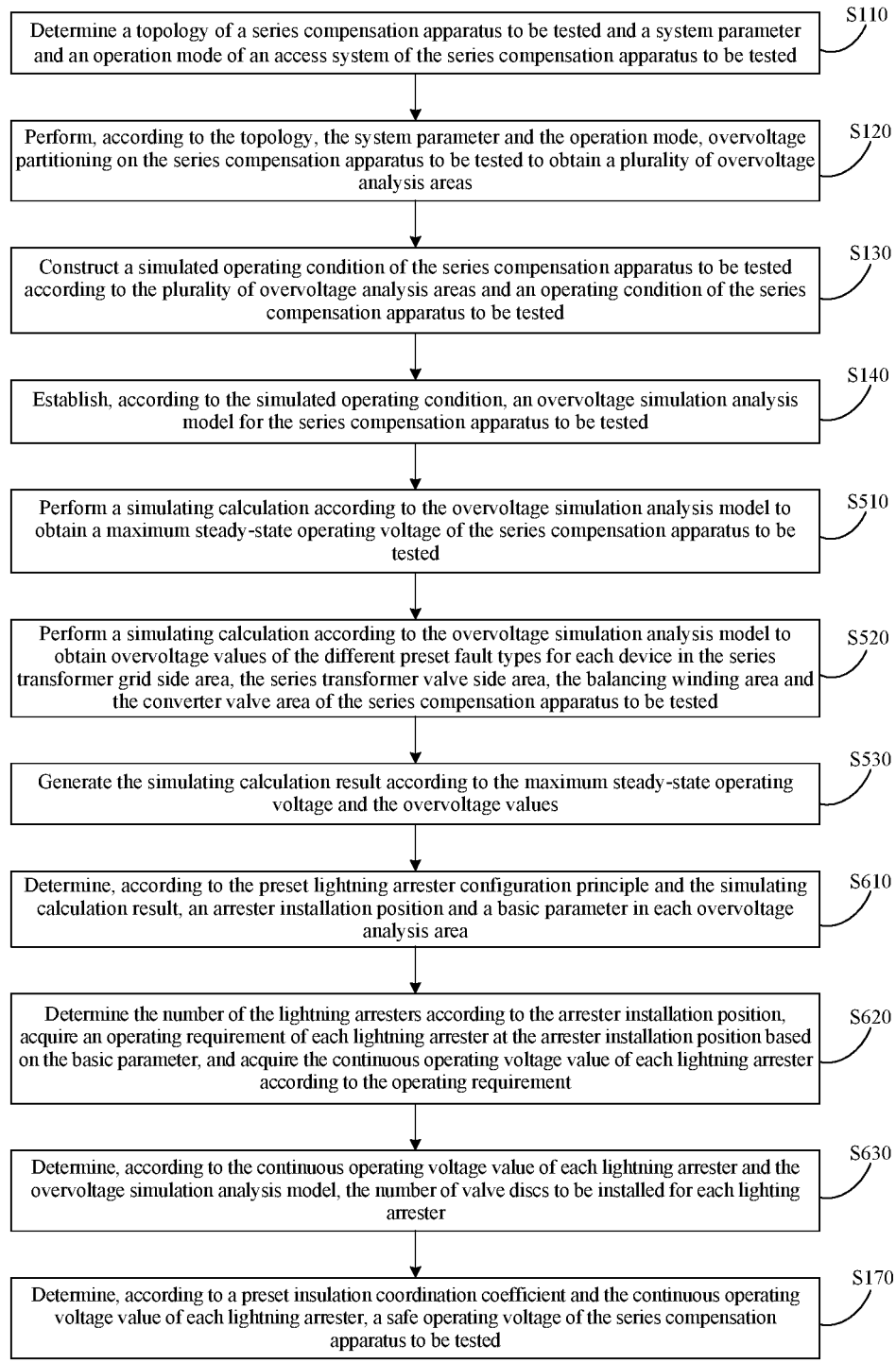
FIG. 4 is a flowchart of another insulation coordination method for a series compensation apparatus according to an embodiment of the present application.

In an embodiment, as shown in FIG. 4, the step S150 in which in each overvoltage analysis area, the simulating calculation is performed for different preset fault types according to the overvoltage simulation analysis model to obtain the simulating calculation result includes steps S510 to S530.

In S510, the simulating calculation is performed according to the overvoltage simulation analysis model to obtain a maximum steady-state operating voltage of the series compensation apparatus to be tested. In practical applications, the maximum steady-state operating voltage is a maximum access voltage under which the series compensation apparatus to be tested can safely and stably operate. When an actual access voltage value exceeds the maximum steady-state operating voltage, the series compensation apparatus to be tested has fault hazards. Therefore, in practical work, it is necessary to ensure that the access voltage value of the series compensation apparatus is lower than the maximum steady-state operating voltage.

In S520, the simulating calculation is performed according to the overvoltage simulation analysis model to obtain overvoltage values of the different preset fault types for each device in the series transformer grid side area, the series transformer valve side area, the balancing winding area and the converter valve area of the series compensation apparatus to be tested overvoltage values. In practical applications, the preset fault types include: a fault of the access system of the series compensation apparatus to be tested, a fault of an adjacent transmission line, each device in the series compensation apparatus to be tested may have multiple types of faults, and the like.

In S530, the simulating calculation result is generated according to the maximum steady-state operating voltage and the overvoltage values. In practical applications, the simulating calculation result includes the maximum steady-state operating voltage of the series compensation apparatus to be tested and the overvoltage values of different devices in the overvoltage analysis areas under the different preset fault types.

In an embodiment, as shown in FIG. 4, the step S160 in which the number of lightning arresters installed in each of the plurality of overvoltage analysis areas and the continuous operating voltage value of each lightning arrester are determined according to the preset lightning arrester configuration principle and the simulating calculation result includes steps S610 to S630.

In S610, arrester installation positions and a basic parameter in each of the plurality of overvoltage analysis areas are determined according to the preset lightning arrester configuration principle and the simulating calculation result.

In an embodiment, the preset lightning arrester configuration principle includes the following guidelines. Overvoltage generated on an alternating current side is limited by an alternating-current-side lightning arrester, overvoltage generated on a direct current side is limited by a direct-current-side lightning arrester, and the critical device is protected by a lightning arrester connected to the critical device. Core devices such as the converter valve need multi-stage protection under the consideration of both reliability and economy, and parameter coordination relationship should be fully considered in multi-level protection. For example, when a fault happens on the series transformer grid side, a fault-induced overvoltage passes through the lightning arrester connected across the series transformer grid side winding, the lightning arrester on the series transformer valve side, the series converter valve bottom lightning arrester and sequentially absorbs energy, and the reference voltages of these lightning arresters are successively higher, improving the protection to the converter valve. In practical applications, the arrester installation positions of the lightning arresters in different overvoltage analysis areas and the basic parameters such as the reference voltages of the lightning arresters are determined according to the preset lightning arrester configuration principle.

In S620, the number of the lightning arresters is determined according to the arrester installation positions, an operating requirement of the lightning arrester at the arrester installation position is acquired based on the basic parameter, and the continuous operating voltage value of each lightning arrester is obtained according to the operating requirement.

In an embodiment, at each arrester installation position, one lightning arrester is installed.

Figure 5:
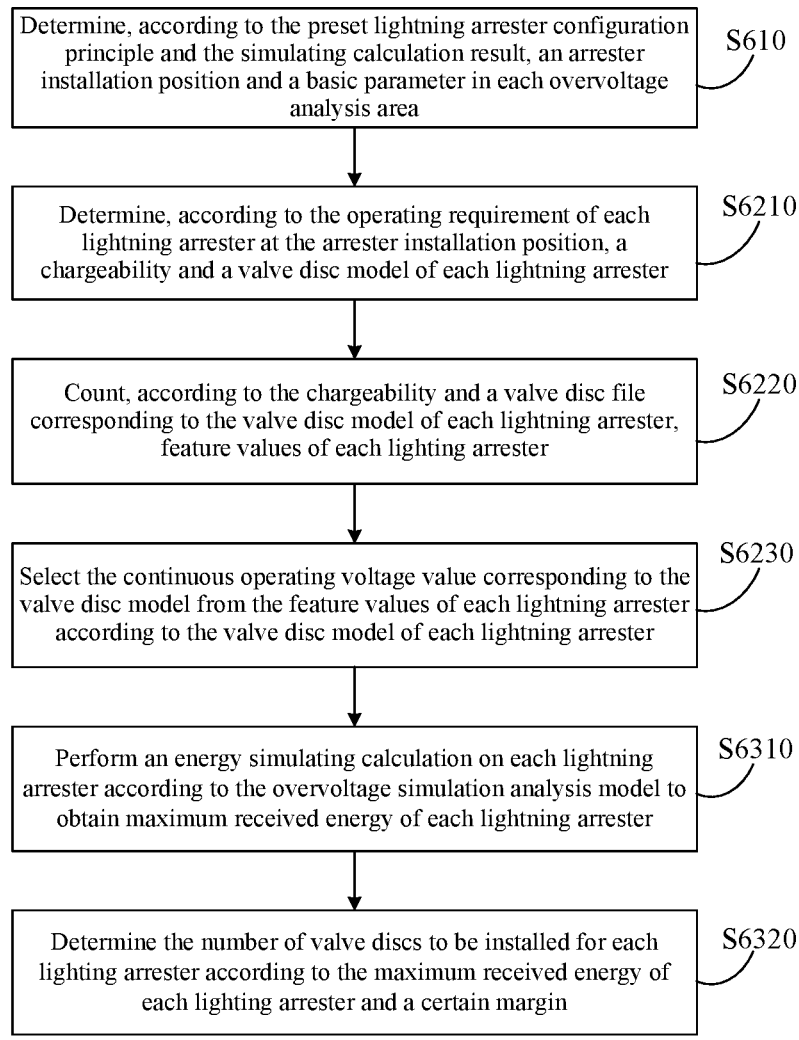
FIG. 5 is a flowchart of yet another insulation coordination method for a series compensation apparatus according to an embodiment of the present application.

In an embodiment, as shown in FIG. 5, the step S620 in which the number of the lightning arresters is determined according to the arrester installation positions, the operating requirement of the lightning arrester at each arrester installation position is acquired based on the basic parameter, and the continuous operating voltage value of each lightning arrester is obtained according to the operating requirement includes steps S6210 to S6230.

In S6210, a chargeability and a valve disc model of each lightning arrester are determined according to the operating requirement of each lightning arrester at the arrester installation position. In practical applications, the lightning arresters at different arrester installation positions protect different devices in the series compensation apparatus to be tested. Since the different devices have different permissible overvoltage values, the chargeability and the valve disc model of the lightning arrester need to be determined according to the operating requirement at the arrester installation position.

In S6220, feature values of each lighting arrester are counted according to the chargeability and a valve disc file corresponding to the valve disc model of each lightning arrester. In an embodiment, the feature values include: a rated continuous operating voltage, a continuous operating voltage peak, a reference voltage of the lighting arrester, and the like. In practical applications, the valve disc file records the rated continuous operating voltage, the continuous operating voltage peak, the reference voltage of the lighting arrester, and the like.

In S6230, the continuous operating voltage value corresponding to the valve disc model is selected from the feature values of each lightning arrester according to the valve disc model of each lightning arrester. Since the chargeability is a ratio of the continuous operating voltage value of the lightning arrester to the rated continuous operating voltage of the lightning arrester, the continuous operating voltage value of the lightning arrester may be calculated through the feature values counted in S6220 according to the valve disc model.

In S630, the number of valve discs to be installed in each lighting arrester is determined according to the continuous operating voltage value of each lighting arrester and the overvoltage simulation analysis model.

In an embodiment, as shown in FIG. 5, the step S630 in which the number of valve discs to be installed for each lighting arrester is determined according to the continuous operating voltage value of each lighting arrester and the overvoltage simulation analysis model includes steps S6310 and S6320.

In S6310, an energy simulating calculation is performed for each lightning arrester according to the overvoltage simulation analysis model to obtain maximum received energy of each lightning arrester.

In an embodiment, the maximum received energy of each lightning arrester may be understood as the maximum energy that the lightning arrester needs to withstand.

In an embodiment, by performing a simulation analysis on the series compensation apparatus to be tested according to the overvoltage simulation analysis model, the maximum overvoltage values under different fault types are determined for each device in the series compensation apparatus to be tested, and then further determined is the maximum received energy that the lightning arrester installed at the corresponding position of each device needs to withstand for ensuring the safety of the device.

In practical applications, in the energy simulation calculation, the maximum energy should be calculated for each lightning arrester. The following conditions may also be considered: the fault type when each arrester installation position is subject to the maximum overvoltage is adopted during the stimulation; the maximum energy likely to be received by each lightning arrester is calculated by correctly considering the protection actions including hardware locking setting value, deviation and delay, a thyristor bypass switch's contacting refusal, and the like; the simulation of the series transformer can use an ideal model and a saturation model, and the calculation of the maximum energy can use the ideal model; a deviation is taken into account fora residual voltage of the lightning arrester, the maximum energy of each lightning arrester is calculated, and whether the deviation is positive or negative is determined according to situations; and in the calculation of the energy of the lightning arrester, other energy release channels are disconnected. For example, in the calculation of the energy of the lightning arrester connected across the series transformer grid side winding, the converter valve and the like are disconnected. Alternatively, other conditions may be added according to a practical operating condition.

In S6320, the number of valve discs to be installed for each lightning arrester is determined according to the maximum received energy of each lightning arrester and a certain margin.

In an embodiment, the margin is a preset value.

In practical applications, after the maximum received energies and the continuous operating voltages are determined for the lightning arresters installed at different positions, the number of valve discs to be installed at the position can be obtained to meet the requirement of the maximum received energy of the lightning arrester and further protect a safe operation of the series compensation apparatus to be tested.

In an embodiment, in S170, the safe operating voltage of the series compensation apparatus to be tested is determined according to the preset insulation coordination coefficient and the continuous operating voltage value of each lightning arrester. In an embodiment, the preset insulation coordination coefficient needs to be determined based on a comprehensive consideration of safety, stability and engineering economy of the series compensation apparatus to be tested. In practical applications, the continuous operating voltage values of the lightning arresters at different positions are different. Since the lightning arresters provide overvoltage protection for the series compensation apparatus, the safe operating voltage of the series compensation apparatus to be tested should be within the continuous operating voltage ranges of all the lightning arresters. In this way, the lightning arresters can ensure the safe operation of the series compensation apparatus to be tested. According to practical engineering requirements and considering a certain voltage margin, the safe operating voltage of the series compensation apparatus to be tested is obtained by multiplying a minimum continuous operating voltage value of the lightning arresters by the preset insulation coordination coefficient. In an example, the minimum continuous operating voltage value of the installed lightning arresters is 1000V and the preset insulation coordination coefficient is 0.85, the safe operating voltage of the series compensation apparatus to be tested is 850V, and the series compensation apparatus to be tested can safely operate at the safe operating voltage.

The insulation coordination method for the series compensation apparatus in the embodiment of the present application accurately calculates the overvoltage value of each device in the series compensation device, determines the lightning arrester configuration scheme, and further determines the safe operating voltage of the series compensation apparatus to be tested, so that the series compensation apparatus can safely operate under various types of faults, improving the stability and reliability of the entire power transmission system. The insulation coordination method for the series compensation apparatus has a wide application range and a high practical engineering application value.

Embodiment 2

Figure 6:
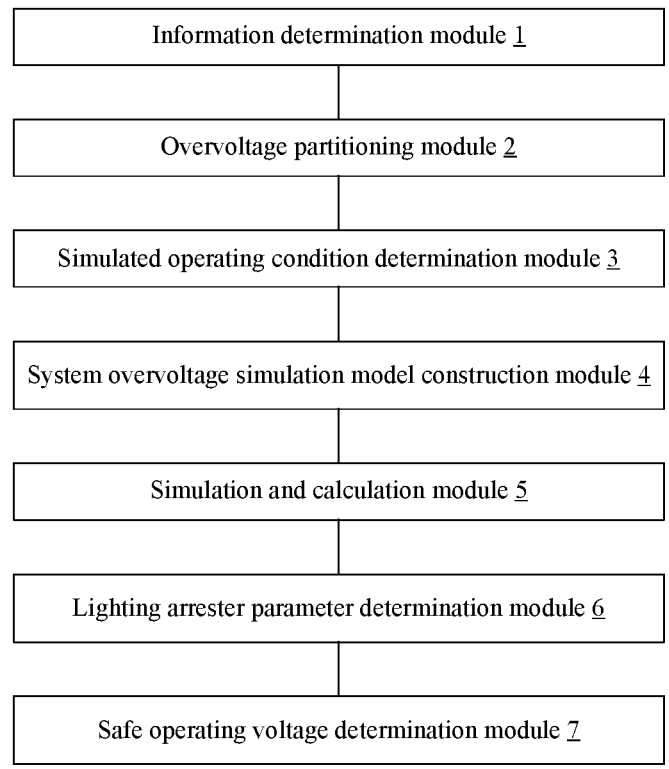
FIG. 6 is a structural diagram of an insulation coordination system for a series compensation apparatus according to an embodiment of the present application.

The embodiment of the present application provides an insulation coordination system for a series compensation apparatus. As shown in FIG. 6, the system includes an information determination module 1, an overvoltage partitioning module 2, a simulated operating condition determination module 3, a system overvoltage simulation analysis model construction module 4, a simulation and calculation 5, a lighting arrester parameter determination module 6, and a safe operating voltage determination module 7.

The information determination module 1 is configured to determine a topology of a series compensation apparatus to be tested and a system parameter and an operation mode of an access system of the series compensation apparatus to be tested. For details, reference can be made to the related description of the step S110 in the embodiment 1.

The overvoltage partitioning module 2 is configured to perform, according to the topology, the system parameter and the operation mode, overvoltage partitioning on the series compensation apparatus to be tested to obtain a plurality of overvoltage analysis areas. For details, reference can be made to the related description of the step S120 in the embodiment 1.

The simulated operating condition determination module 3 is configured to construct a simulated operating condition of the series compensation apparatus to be tested according to the plurality of overvoltage analysis areas and an operating condition of the series compensation apparatus to be tested. For details, reference can be made to the related description of the step S130 in the embodiment 1.

The overvoltage simulation analysis model construction module 4 is configured to establish, according to the simulated operating condition, an overvoltage simulation analysis model for the series compensation apparatus to be tested. For details, reference can be made to the related description of the step S140 in the embodiment 1.

The simulation and calculation 5 is configured to perform, in each of the plurality of overvoltage analysis areas, simulating calculations for different preset fault types according to the overvoltage simulation analysis model to obtain a simulating calculation result. For details, reference can be made to the related description of the step S150 in the embodiment 1.

The lighting arrester parameter determination module 6 is configured to determine, according to a preset lightning arrester configuration principle and the simulating calculation result, the number of lightning arresters installed in each of the plurality of overvoltage analysis areas and a continuous operating voltage value of each lightning arrester. For details, reference can be made to the related description of the step S160 in the embodiment 1.

The safe operating voltage determination module 7 is configured to determine, according to a preset insulation coordination coefficient and the continuous operating voltage value of each lightning arrester, a safe operating voltage of the series compensation apparatus to be tested. For details, reference can be made to the related description of the step S170 in the embodiment 1.

In an embodiment, the plurality of overvoltage analysis areas include a series transformer grid side area, a series transformer valve side area, a balancing winding area, and a converter valve area.

In an embodiment, the simulation and calculation 5 is configured to perform operations described below.

The simulation and calculation module performs a simulating calculation according to the overvoltage simulation analysis model to obtain a maximum steady-state operating voltage of the series compensation apparatus to be tested.

The simulation and calculation module performs a simulating calculation according to the overvoltage simulation analysis model to obtain overvoltage values of the different preset fault types for each device in the series transformer grid side area, the series transformer valve side area, the balancing winding area and the converter valve area of the series compensation apparatus to be tested.

The simulation and calculation module generates the simulating calculation result according to the maximum steady-state operating voltage and the overvoltage values.

In an embodiment, the lighting arrester parameter determination module 6 is configured to perform operations described below.

The lighting arrester parameter determination module determines, according to the preset lightning arrester configuration principle and the simulating calculation result, arrester installation positions and a basic parameter in each overvoltage analysis area.

The lighting arrester parameter determination module determines the number of the lightning arresters according to the arrester installation positions.

The lighting arrester parameter determination module acquires an operating requirement of each lightning arrester at the arrester installation position based on the basic parameter, and acquires the continuous operating voltage value of each lightning arrester according to the operating requirement.

The lighting arrester parameter determination module determines, according to the continuous operating voltage value and the overvoltage simulation analysis model, the number of valve discs to be installed for each lighting arrester.

In an embodiment, the lighting arrester parameter determination module 6 is configured to perform operations described below.

The lighting arrester parameter determination module determines, according to the operating requirement of each lightning arrester at the arrester installation position, a chargeability and a valve disc model of each lightning arrester.

The lighting arrester parameter determination module counts feature values of each lighting arrester according to the chargeability and a valve disc file corresponding to the valve disc model of each lightning arrester.

The lighting arrester parameter determination module selects the continuous operating voltage value corresponding to the valve disc model from the feature values of each lightning arrester according to the valve disc model of each lightning arrester.

In an embodiment, the feature values include a rated continuous operating voltage, a continuous operating voltage peak and a reference voltage.

In an embodiment, the lighting arrester parameter determination module 6 is configured to perform operations described below.

The lighting arrester parameter determination module performs an energy simulating calculation on each lightning arrester according to the overvoltage simulation analysis model to obtain maximum received energy of each lightning arrester.

The lighting arrester parameter determination module determines, according to the maximum received energy of each lighting arrester, the number of valve discs to be installed of each lighting arrester.

Through the cooperation of the above-mentioned modules, the insulation coordination system for the series compensation apparatus provided by the embodiment of the present application accurately calculates overvoltage values of various devices in the series compensation apparatus, determines a lightning arrester configuration scheme, and further determines the safe operating voltage of the series compensation apparatus to be tested, so that the series compensation apparatus can safely operate under various fault types, thereby improving stability and reliability of an entire power transmission system. The insulation coordination method for the series compensation apparatus has a wide application range and a high practical engineering application value.

Embodiment 3

The embodiment of the present application provides a non-transient computer storage medium. The computer storage medium stores computer-executable instructions for implementing the method according to any one of the embodiments described above. In an embodiment, the storage medium may be a magnetic disk, an optical disk, a read-only memory (ROM), a random access memory (RAM), a flash memory, a hard disk drive (HDD), a solid-state drive (SDD) or the like. The storage medium may further include a combination of the preceding memories.

Embodiment 4

Figure 7:
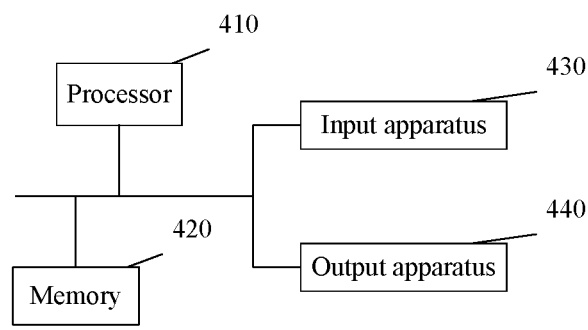
FIG. 7 is a structural diagram of an electronic device according to an embodiment of the present application.

The embodiment of the present application provides an electronic device for implementing an insulation coordination method for a series compensation apparatus. FIG. 7 is a structural diagram of the electronic device. As shown in FIG. 7, the electronic device includes one or more processors 410 and a memory 420. One processor 410 is taken as an example in FIG. 7.

The electronic device for implementing the insulation coordination method for the series compensation apparatus may further include an input apparatus 430 and an output apparatus 440.

The processor 410, the memory 420, the input apparatus 430 and the output apparatus 440 may be connected via a bus or by other means. FIG. 7 uses a connection via a bus as an example.

The processor 410 may be central processing unit (CPU). The processor 410 may also be a general-purpose processor, a digital signal processor (DSP), an application specific integrated circuit (ASIC), a field-programmable gate array (FPGA) or other programmable logic devices, discrete gates or transistor logic devices, discrete hardware components, or any combination thereof. The general-purpose processor may be a microprocessor or any conventional processor.

As a non-transient computer-readable storage medium, the memory 420 may be configured to store non-transient software programs and non-transient computer-executable programs and modules, such as program instructions/modules corresponding to the insulation coordination method for the series compensation apparatus in the embodiments of the present application. The processor 410 executes the non-transient software programs, instructions and modules stored in the memory 420 to perform one or more functional applications and data processing of a server, that is, to implement the insulation coordination method for the series compensation apparatus in the method embodiments described above.

The memory 420 may include a program storage area and a data storage area. The program storage area may store an operating system and an application program required by at least one function. The data storage area may store data created according to the use of an insulation coordination processing apparatus for the series compensation apparatus. Additionally, the memory 420 may include a high-speed random access memory, and may further include a non-transient memory, such as at least one disk memory, a flash memory or other non-transient solid-state memories. In some embodiments, the memory 420 may optionally include memories that are remotely disposed with respect to the processor 410. These remote memories may be connected to an insulation coordination apparatus for the series compensation apparatus via a network. Examples of the preceding network include the Internet, an intranet, a local area network, a mobile communication network and a combination thereof.

The input apparatus 430 may receive inputted digital or character information and generate key signal inputs related to user settings and function control of the insulation coordination processing apparatus for the series compensation apparatus. The output apparatus 440 may include a display screen and other display devices.

When executed by the one or more processors 410, one or more modules stored in the memory 420 execute the methods shown in FIG. 1 to FIG. 5.

The above products can execute the method provided by the embodiments of the present application, and includes functional modules and effects corresponding to the method. Technical details that not described in detail in the embodiments of the present application can refer to the related descriptions of the embodiments shown in FIG. 1 to FIG. 5.

What is claimed is:

1. An insulation coordination method for a series compensation apparatus, comprising:
   determining a topology of a series compensation apparatus to be tested and a system parameter and an operation mode of an access system of the series compensation apparatus to be tested;
   performing, according to the topology, the system parameter and the operation mode, overvoltage partitioning on the series compensation apparatus to be tested to obtain a plurality of overvoltage analysis areas;
   constructing a simulated operating condition of the series compensation apparatus to be tested according to the plurality of overvoltage analysis areas and an operating condition of the series compensation apparatus to be tested;
   establishing, according to the simulated operating condition, an overvoltage simulation analysis model for the series compensation apparatus to be tested;
   in each of the plurality of overvoltage analysis areas, performing a simulating calculation for different preset fault types according to the overvoltage simulation analysis model to obtain a simulating calculation result;
   determining, according to a preset lightning arrester configuration principle and the simulating calculation result, a number of lightning arresters installed in each of the plurality of overvoltage analysis areas and a continuous operating voltage value of each lightning arrester; and
   determining, according to a preset insulation coordination coefficient and the continuous operating voltage value of each lightning arrester, a safe operating voltage of the series compensation apparatus to be tested.

2. The method of claim 1, wherein the plurality of overvoltage analysis areas comprise a series transformer grid side area, a series transformer valve side area, a balancing winding area and a converter valve area.

3. The method of claim 1, wherein in each of the plurality of overvoltage analysis areas, performing a simulating calculation for different preset fault types according to the overvoltage simulation analysis model to obtain the simulating calculation result comprises:
   performing a simulating calculation according to the overvoltage simulation analysis model to obtain a maximum steady-state operating voltage of the series compensation apparatus to be tested;
   performing a simulating calculation according to the overvoltage simulation analysis model to obtain overvoltage values of the different preset fault types for each device in the series compensation apparatus to be tested; and
   generating the simulating calculation result according to the maximum steady-state operating voltage and the overvoltage values.

4. The method of claim 1, wherein determining, according to the preset lightning arrester configuration principle and the simulating calculation result, the number of the lightning arresters installed in each of the plurality of overvoltage analysis areas and the continuous operating voltage value of each lightning arrester comprises:
   determining, according to the preset lightning arrester configuration principle and the simulating calculation result, an arrester installation position and a basic parameter in each of the plurality of overvoltage analysis areas;
   determining, according to the arrester installation position, the number of the lightning arresters;
   acquiring an operating requirement of each lightning arrester at the arrester installation position based on the basic parameter, and obtaining the continuous operating voltage value of each lightning arrester according to the operating requirement; and
   determining, according to the continuous operating voltage value and the overvoltage simulation analysis model, a number of valve discs to be installed for each lighting arrester.

5. The method of claim 4, wherein acquiring the operating requirement of each lightning arrester at the arrester installation position based on the basic parameter, and obtaining the continuous operating voltage value of each lightning arrester according to the operating requirement comprises:
   determining, according to the operating requirement of each lightning arrester at the arrester installation position, a chargeability and a valve disc model of each lightning arrester;
   counting, according to the chargeability and a valve disc file corresponding to the valve disc model of each lightning arrester, feature values of each lighting arrester; and
   selecting the continuous operating voltage value corresponding to the valve disc model from the feature values of each lightning arrester according to the valve disc model of each lightning arrester.

6. The method of claim 5, wherein the feature values comprise a rated continuous operating voltage, a continuous operating voltage peak, and a reference voltage.

7. The method of claim 4, wherein determining, according to the continuous operating voltage value and the overvoltage simulation analysis model, the number of valve discs to be installed for each lighting arrester comprises:
   performing an energy simulating calculation on each lightning arrester according to the overvoltage simulation analysis model to obtain maximum received energy of each lightning arrester; and
   determining, according to the maximum received energy of each lighting arrester, the number of valve discs to be installed of each lighting arrester.

8. A non-transient computer-readable storage medium, configured to store computer instructions for implementing an insulation coordination method for a series compensation apparatus when the computer instructions are executed by a processor,
   wherein the insulation coordination method comprises:
   determining a topology of the series compensation apparatus and a system parameter and an operation mode of an access system of the series compensation apparatus;
   performing, according to the topology, the system parameter and the operation mode, overvoltage partitioning on the series compensation apparatus to obtain a plurality of overvoltage analysis areas;
   constructing a simulated operating condition of the series compensation apparatus according to the plurality of overvoltage analysis areas and an operating condition of the series compensation apparatus;
   establishing, according to the simulated operating condition, an overvoltage simulation analysis model for the series compensation apparatus;
   in each of the plurality of overvoltage analysis areas, performing a simulating calculation for different preset fault types according to the overvoltage simulation analysis model to obtain a simulating calculation result;
   determining, according to a preset lightning arrester configuration principle and the simulating calculation result, a number of lightning arresters installed in each of the plurality of overvoltage analysis areas and a continuous operating voltage value of each lightning arrester; and determining, according to a preset insulation coordination coefficient and the continuous operating voltage value of each lightning arrester, a safe operating voltage of the series compensation apparatus.

9. The storage medium of claim 8, wherein the plurality of overvoltage analysis areas comprise a series transformer grid side area, a series transformer valve side area, a balancing winding area and a converter valve area.

10. The storage medium of claim 8, wherein in each of the plurality of overvoltage analysis areas, performing a simulating calculation for different preset fault types according to the overvoltage simulation analysis model to obtain the simulating calculation result comprises:

performing a simulating calculation according to the overvoltage simulation analysis model to obtain a maximum steady-state operating voltage of the series compensation apparatus;

performing a simulating calculation according to the overvoltage simulation analysis model to obtain overvoltage values of the different preset fault types for each device in the series compensation apparatus; and generating the simulating calculation result according to the maximum steady-state operating voltage and the overvoltage values.

11. The storage medium of claim 8, wherein determining, according to the preset lightning arrester configuration principle and the simulating calculation result, the number of the lightning arresters installed in each of the plurality of overvoltage analysis areas and the continuous operating voltage value of each lightning arrester comprises:

determining, according to the preset lightning arrester configuration principle and the simulating calculation result, one or more arrester installation positions and a basic parameter in each of the plurality of overvoltage analysis areas;

determining, according to the one or more arrester installation positions, the number of the lightning arresters in each of the plurality of overvoltage analysis areas;

acquiring an operating requirement of each lightning arrester at its arrester installation position based on the basic parameter, and obtaining the continuous operating voltage value of each lightning arrester according to the operating requirement; and determining, according to the continuous operating voltage value and the overvoltage simulation analysis model, a number of valve discs to be installed for each lighting arrester.

12. The storage medium of claim 11, wherein acquiring the operating requirement of each lightning arrester at its arrester installation position based on the basic parameter, and obtaining the continuous operating voltage value of each lightning arrester according to the operating requirement comprises:

determining, according to the operating requirement of each lightning arrester at its arrester installation position, a chargeability and a valve disc model of each lightning arrester;

counting, according to the chargeability and a valve disc file corresponding to the valve disc model of each lightning arrester, feature values of each lighting arrester; and selecting the continuous operating voltage value corresponding to the valve disc model from the feature values of each lightning arrester according to the valve disc model of each lightning arrester.

13. The storage medium of claim 12, wherein the feature values comprise a rated continuous operating voltage, a continuous operating voltage peak, and a reference voltage.

14. The storage medium of claim 11, wherein determining, according to the continuous operating voltage value and the overvoltage simulation analysis model, the number of valve discs to be installed for each lighting arrester comprises:

performing an energy simulating calculation on each lightning arrester according to the overvoltage simulation analysis model to obtain maximum received energy of each lightning arrester; and determining, according to the maximum received energy of each lightning arrester, the number of valve discs to be installed of each lightning arrester.

15. An electronic device, comprising:

at least one processor; and a memory communicably connected to the at least one processor, wherein the memory stores instructions executable by the at least one processor, which, when executed by the at least one processor, enable the at least one processor to execute an insulation coordination method for a series compensation apparatus, wherein the insulation coordination method comprises:

determining a topology of the series compensation apparatus and a system parameter and an operation mode of an access system of the series compensation apparatus;

performing, according to the topology, the system parameter and the operation mode, overvoltage partitioning on the series compensation apparatus to obtain a plurality of overvoltage analysis areas;

constructing a simulated operating condition of the series compensation apparatus according to the plurality of overvoltage analysis areas and an operating condition of the series compensation apparatus;

establishing, according to the simulated operating condition, an overvoltage simulation analysis model for the series compensation apparatus;

in each of the plurality of overvoltage analysis areas, performing a simulating calculation for different preset fault types according to the overvoltage simulation analysis model to obtain a simulating calculation result;

determining, according to a preset lightning arrester configuration principle and the simulating calculation result, a number of lightning arresters installed in each of the plurality of overvoltage analysis areas and a continuous operating voltage value of each lightning arrester; and determining, according to a preset insulation coordination coefficient and the continuous operating voltage value of each lightning arrester, a safe operating voltage of the series compensation apparatus.

16. The electronic device of claim 15, wherein the plurality of overvoltage analysis areas comprise a series transformer grid side area, a series transformer valve side area, a balancing winding area and a converter valve area.

17. The electronic device of claim 15, wherein in each of the plurality of overvoltage analysis areas, performing a simulating calculation for different preset fault types according to the overvoltage simulation analysis model to obtain the simulating calculation result comprises:

performing a simulating calculation according to the overvoltage simulation analysis model to obtain a maximum steady-state operating voltage of the series compensation apparatus;

performing a simulating calculation according to the overvoltage simulation analysis model to obtain overvoltage values of the different preset fault types for each device in the series compensation apparatus; and generating the simulating calculation result according to the maximum steady-state operating voltage and the overvoltage values.

18. The electronic device of claim 15, wherein determining, according to the preset lightning arrester configuration principle and the simulating calculation result, the number of the lightning arresters installed in each of the plurality of overvoltage analysis areas and the continuous operating voltage value of each lightning arrester comprises:

determining, according to the preset lightning arrester configuration principle and the simulating calculation result, one or more arrester installation positions and a basic parameter in each of the plurality of overvoltage analysis areas;

determining, according to the one or more arrester installation positions, the number of the lightning arresters in each of the plurality of overvoltage analysis areas;

acquiring an operating requirement of each lightning arrester at its arrester installation position based on the basic parameter, and obtaining the continuous operating voltage value of each lightning arrester according to the operating requirement; and determining, according to the continuous operating voltage value and the overvoltage simulation analysis model, a number of valve discs to be installed for each lighting arrester.

19. The electronic device of claim 18, wherein acquiring the operating requirement of each lightning arrester at its arrester installation position based on the basic parameter, and obtaining the continuous operating voltage value of each lightning arrester according to the operating requirement comprises:

determining, according to the operating requirement of each lightning arrester at its arrester installation position, a chargeability and a valve disc model of each lightning arrester;

counting, according to the chargeability and a valve disc file corresponding to the valve disc model of each lightning arrester, feature values of each lighting arrester; and selecting the continuous operating voltage value corresponding to the valve disc model from the feature values of each lightning arrester according to the valve disc model of each lightning arrester.

20. The electronic device of claim 18, wherein determining, according to the continuous operating voltage value and the overvoltage simulation analysis model, the number of valve discs to be installed for each lighting arrester comprises:

performing an energy simulating calculation on each lightning arrester according to the overvoltage simulation analysis model to obtain maximum received energy of each lightning arrester; and determining, according to the maximum received energy of each lighting arrester, the number of valve discs to be installed of each lighting arrester.

* * * * *